United States Patent
Gschwendtner

(10) Patent No.: US 6,735,565 B2
(45) Date of Patent: May 11, 2004

(54) SELECT A RECOGNITION ERROR BY COMPARING THE PHONETIC

(75) Inventor: Wolfgang Gschwendtner, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/242,930

(22) Filed: Sep. 13, 2002

(65) Prior Publication Data
US 2003/0061043 A1 Mar. 27, 2003

(30) Foreign Application Priority Data
Sep. 17, 2001 (EP) .......................... 01000468

(51) Int. Cl.[7] .................................. G10L 15/04
(52) U.S. Cl. .................. 704/254; 704/231; 704/235; 704/251; 704/254; 704/531; 704/260; 704/270
(58) Field of Search ..................... 704/231, 251, 704/235, 254, 531, 260, 270

(56) References Cited

U.S. PATENT DOCUMENTS

| | | | | |
|---|---|---|---|---|
| 4,866,778 A | * | 9/1989 | Baker ........................ 704/254 |
| 5,752,227 A | * | 5/1998 | Lyberg ....................... 704/235 |
| 5,799,276 A | * | 8/1998 | Komissarchik et al. ..... 704/251 |
| 5,909,667 A | | 6/1999 | Leontiades et al. ......... 704/275 |
| 6,064,961 A | * | 5/2000 | Hanson ....................... 704/260 |
| 6,173,259 B1 | * | 1/2001 | Bijl et al. ................... 704/235 |
| 6,418,410 B1 | * | 7/2002 | Nassiff et al. .............. 704/251 |
| 6,457,031 B1 | * | 9/2002 | Hanson ....................... 715/531 |
| 6,611,802 B2 | * | 8/2003 | Lewis et al. ................ 704/235 |
| 2002/0116196 A1 | * | 8/2002 | Tran ........................... 704/270 |
| 2002/0138265 A1 | * | 9/2002 | Stevens et al. ............. 704/251 |

* cited by examiner

Primary Examiner—Richemond Dorvil
Assistant Examiner—Qi Ham
(74) Attorney, Agent, or Firm—John Vodopia

(57) ABSTRACT

A correction device (4) for a speech recognition device (2) is provided, with which the replacement of incorrectly recognized words (FETI) of the recognized text (ETI) is especially simple to execute. The correction device (4) is based on the recognition that the phoneme sequences of incorrectly recognized words and the spoken words actually to be recognized are very similar, and automatically marks words in the recognized text (ETI) which show a phoneme sequence similar to that of a correction word (KWI) put in by the user.

13 Claims, 2 Drawing Sheets

SELECT A RECOGNITION ERROR BY COMPARING THE PHONETIC

FIELD OF THE INVENTION

The invention relates to a correction device for correcting a text recognized by a speech recognition device for a spoken text, where the recognized text for spoken words of the spoken text includes correctly recognized words and incorrectly recognized words.

The invention further relates to a correction method for correcting a text recognized by a speech recognition device for a spoken text, where the recognized text for spoken words of the spoken text includes correctly recognized words and incorrectly recognized words.

BACKGROUND OF THE INVENTION

Such a correction device and such a correction method are known from the document U.S. Pat. No. 5,909,667, in which a dictation device is disclosed. The known dictation device is formed by a computer which operates speech recognition software and word-processing software. A user of the known dictation device can speak a text into a microphone connected to the computer. The speech recognition software forming a speech recognition facility assigns a known word to each spoken word of the spoken text, by which means a recognized text is obtained for the spoken text. The recognized text contains so-called correctly recognized words, which match the words that the user actually spoke, and so-called incorrectly recognized words, which do not match the words that the user actually spoke. The recognized text is presented on a screen connected to the computer, by the word-processing software forming a word-processing facility.

The known dictation device also forms a correction device, which contains both the word-processing software and the speech recognition software, and with which incorrectly recognized words can be replaced with correction words. For this purpose, the user marks the incorrectly recognized word, inputs the correction word or words with a keyboard of the computer, and then enters a confirmation, causing the marked incorrectly recognized word to be replaced by the input correction word.

To simplify the marking of the incorrectly recognized word to be replaced, the user of the known dictation device can speak the incorrectly recognized word to be replaced—a so-called marker word—into the microphone once again. The speech recognition software thereupon recognizes a recognized marker word for this spoken marker word, and the word-processing software searches for the recognized marker word in the words of the recognized text. If the recognized marker word is found through a comparison of letter sequences of words in the recognized text, the word-processing device will mark this marker word. After speaking the marker word, the user must check whether the word to be replaced was actually marked. If this is the case, the user inputs the correction word and a confirmation using the keyboard, to implement the replacement.

With the known dictation device, the disadvantage has emerged that it is precisely those incorrectly recognized words contained in the recognized text which are difficult for the speech recognition software to recognize, so that a high error rate also occurs in the recognition of marker words. As a result, other words of the recognized text information rather than the incorrectly recognized words are relatively often marked for replacement, which means additional work. A further disadvantage of the known dictation device has emerged in that the user must execute relatively many different actions (microphone and keyboard) in order to replace an incorrectly recognized word.

BRIEF SUMMARY OF THE INVENTION

It is an object of the invention to create a correction device as specified in the first paragraph and a correction method as specified in the second paragraph in which the aforementioned disadvantages are avoided.

To achieve the above object, inventive features are provided in such a correction device so that the correction device can be characterized in the following way. A correction device for correcting a text recognized by a speech recognition device for a spoken text, where the recognized text for spoken words of the spoken text includes correctly recognized words and incorrectly recognized words, with input means for receiving at least one manually input correction word in order to replace at least one of the incorrectly recognized words with at least one correction word, and with transcription means for phonetic transcribing of at least the input correction word into a phoneme sequence, and with search means for finding the phoneme sequence of the at least one correction word in phoneme sequences of the words of the recognized text and for issuing position information which identifies the position of at least one word within the recognized text whose phoneme sequence essentially matches the phoneme sequence of the at least one correction word, and with output means for issuing the position information so as to enable a marking of the at least one word identified by the position information in the recognized text information.

To achieve the above object, inventive features are provided in such a correction method so that the correction method can be characterized in the following way.

A correction method for correcting a text recognized by a speech recognition device for a spoken text, where the recognized text for spoken words of the spoken text includes correctly recognized words and incorrectly recognized words, the following steps being processed:

receiving at least one manually entered correction word so as to replace at least one of the incorrectly recognized words with at least one correction word;

phonetically transcribing at least the input correction word into a phoneme sequence;

searching for the phoneme sequence of the at least one correction word in phoneme sequences of the words of the recognized text and issuing position information which identifies the position of at least one word within the recognized text whose phoneme sequence essentially matches the phoneme sequence of the at least one correction word;

issuing the position information so as to enable a marking of the at least one word identified by the position information in the recognized text information.

The invention is based on the recognition that the words incorrectly recognized by a speech recognition device and the words that should actually have been recognized—i.e. the words to be recognized correctly—very often sound very similar. For such similarly sounding words in particular, for example "four" and "for", the error rate of known speech recognition devices is often especially high.

As a result of the features according to the invention, the user does not need to mark an incorrectly recognized word that he wants to replace with a correction word that should actually have been recognized. The correction device determines the phoneme sequence of the input correction word by statistical methods, which phoneme sequence represents the sound of the correction word. By comparing the phoneme sequences, the correction device then searches for a word that sounds similar to the correction word in the recognized text.

Advantageously, the incorrectly recognized word very probably to be replaced in the recognized text information is thus automatically marked by the input of the correction word. The user can effect the replacement of the marked word by inputting a confirmation, or cause marking of a further similar sounding word of the recognized text information by inputting a next information.

Known correction devices of speech recognition devices enable a synchronous reproduction of the spoken words and the associated recognized words of the recognized text for the correction of incorrectly recognized words. When the user of these known correction devices notices an incorrectly recognized word, he interrupts the synchronous reproduction and executes the replacement of the incorrectly recognized word with a word put in by the user. The user then activates the synchronous reproduction again in order to find and correct further incorrectly recognized words in the recognized text.

According to the measures of claim 2 and claim 9, the advantage is gained that the synchronous reproduction is automatically interrupted as soon as the user begins to input a correction word.

According to the measures of claim 3 and claim 10, the advantage is gained that the interruption of the synchronous reproduction is automatically terminated again as soon as the user confirms by input of the confirmation that the automatically marked word should be replaced with the input correction word.

In the synchronous reproduction, the user of a correction device recognizes an incorrectly recognized word in the environment of the word, which is currently being acoustically reproduced and optically marked during the synchronous reproduction. According to the measures of claim 4 and claim 11, the advantage is gained that the search means initially look in the immediate vicinity of the word marked in the recognized text at the time of the interruption for a similar sounding word, and initially mark this. If the user should initiate a further search by entering the next information, then the search area is widened.

In a speech recognition procedure, the speech recognition device first determines a phoneme sequence associated with the spoken text, and based on this phoneme sequence recognizes the recognized text. According to the measures of claim 5 and claim 12, the advantage is gained that in their search for the phoneme sequence of the correction word, the search means use the phoneme sequence already determined by the speech recognition device. This is especially advantageous if the correction device forms part of the speech recognition device.

To increase the reliability of the search means, it has proved advantageous that phonemes that sound very similar are rated as identical phonemes in the search. Thus, for example, in phoneme sequences of English words, the phonemes "v" and "f", and "t" and "d", are taken to be identical in the search by the search means.

BRIEF DESCRIPTION OF THE DRAWINGS

The invention will be described in more detail below with reference to an embodiment to which, however, the invention is not limited.

DETAILED DESCRIPTION OF THE INVENTION

Figure 1:
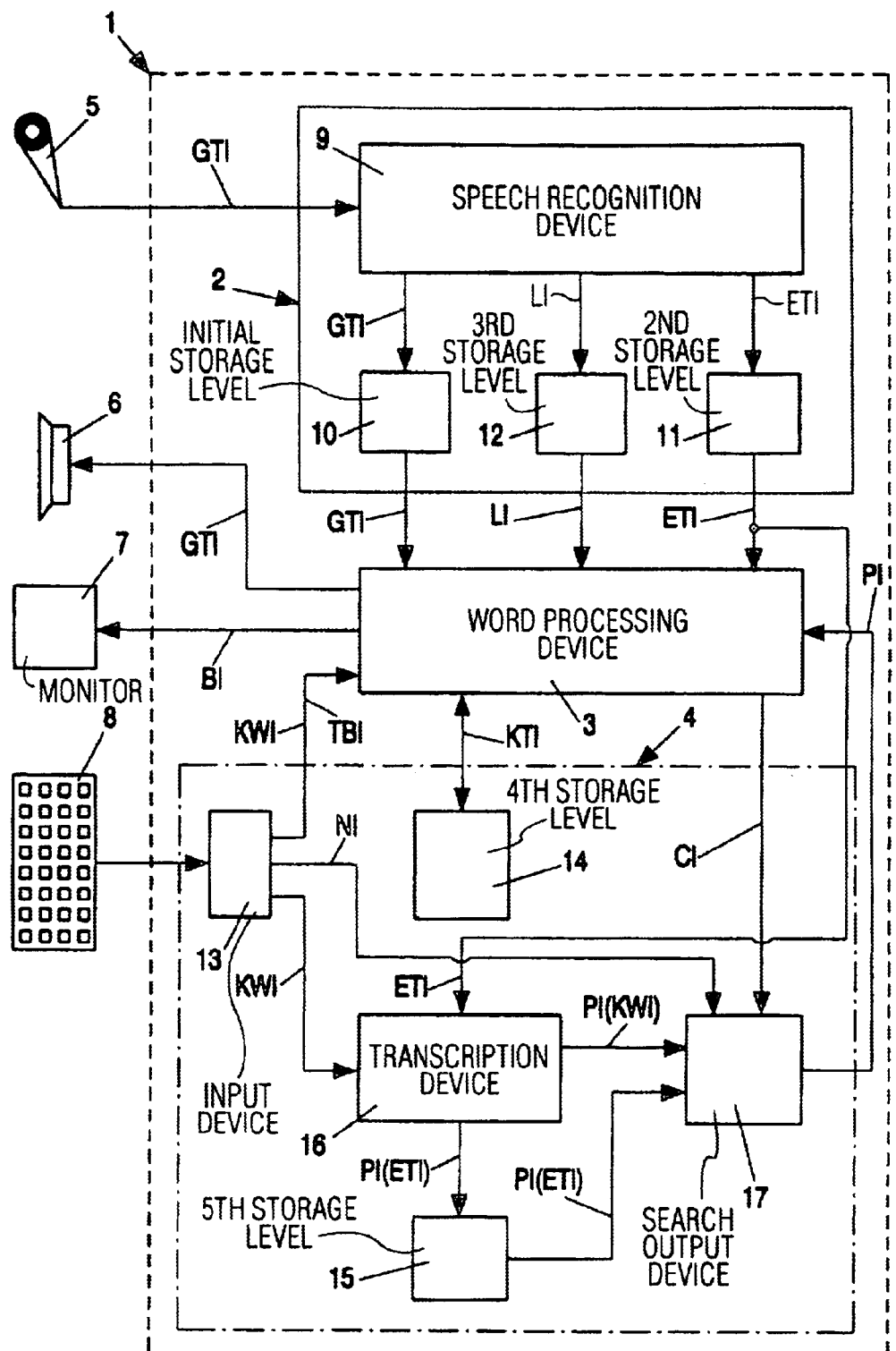
FIG. 1 shows a computer which processes speech recognition software and word-processing software and which forms a correction device for correcting a text recognized by the speech recognition device for a spoken text.

FIG. 1 shows a computer 1 which forms a speech recognition device 2, a word-processing device 3, and a correction device 4. The speech recognition device 2 and the correction device 4 are formed with speech recognition software processed by the computer 1, and the word-processing device 3 is formed with word-processing software processed by the computer 1.

A microphone 5, a loudspeaker 6, a monitor 7, and a keyboard 8 are connected to the computer 1. A user of the computer 1 can speak a text into the microphone 5, whereupon spoken text information GTI including this spoken text is output as an analog audio signal to speech recognition means 9 of the speech recognition device 2.

The speech recognition means 9 are designed to recognize the recognized text information ETI to be related to the spoken text information GTI, as has long been known. For this purpose, the speech recognition means 9 store the spoken text information GTI as digital audio data in an initial storage level 10. In the processing of a speech recognition procedure by the speech recognition means 9, the speech recognition means 9 first relate phoneme sequences containing phonemes to the spoken text information GTI. As is generally known, phonemes are small acoustic units, and a phoneme sequence of a word reproduces the acoustic impression of a spoken word. The word "DAYS", for example, is allocated the phoneme sequence "d Y z".

In the subsequent processing of the speech recognition procedure, the phoneme sequences determined from the spoken text information GTI are searched for in a lexicon memory, in which a related phoneme sequence is stored for each of a large number of words.

If a detected phoneme sequence has been found in the lexicon memory, then the related stored word is determined as a possibly recognized word. The sequences of possibly recognized words for the detected phoneme sequences are then searched for in a speech model memory, and the most probable sequence of possibly recognized words is stored in a second storage level 11 as recognized text information for the spoken text information GTI.

The recognized text information ETI contains correctly recognized text information RETI formed by so-called correctly recognized words, which match the words that the user actually spoke. The recognized text information ETI also contains incorrectly recognized text information FETI formed by so-called incorrectly recognized words, which do not match the words that the user actually spoke. Words incorrectly recognized by the speech recognition device 9 and the words that should actually have been recognized—i.e. the spoken words—often sound very similar, as will be discussed in more detail below.

In the speech recognition procedure, link information LI is also determined, and stored in a third memory level 12. The link information LI identifies for each word of the spoken text information GTI the associated recognized word of the recognized text information ETI, and enables a synchronous reproduction operating mode, as will be discussed in more detail below. The described speech recognition procedure has long been known, so it is not dealt with in any more detail.

The word-processing device 3 is designed for reading the recognized text information ETI stored in the second memory level 11 and for outputting screen information BI comprising this recognized text information ETI to the monitor 7. From the keyboard 8, correction information can be passed on to the word-processing device 3 through input means 13 of the correction device 4, in order to edit or change the recognized text information ETI, this then defining a corrected text information KTI which can be stored in a fourth memory level 14 of the correction device 4.

When the synchronous reproduction operating mode is activated, the computer 1 is designed for automatic marking of a word of the recognized text information ETI presented on the monitor 7, and for synchronous, i.e. simultaneous, acoustic reproduction through the loudspeaker 6 of the spoken word allocated by the link information LI. For this, the word-processing device 3 reads both the recognized text information ETI and the spoken text information GTI as well as the link information LI from the corresponding memory levels 10, 11 and 12.

When the synchronous reproduction operating mode is activated, the user can check whether the presented marked word was correctly recognized for the spoken word that has just been acoustically reproduced. This feature is known as "synchronous playback" and is described, for example in U.S. Pat. No. 5,031,113, so it is not dealt with in any more detail here.

The correction device 4 further comprises the input means 13, the fourth memory level 14, a fifth memory level 15, transcription means 16, and search means 17. The transcription means 16 are designed for phonetically transcribing a word by statistical methods. The stored phoneme sequences allocated to words stored in the lexicon memory are read by these means. Words not stored in the lexicon memory are broken down into separate syllables, and an associated phoneme sequence is determined by assembling the phonemes of these syllables from the lexicon memory.

When the synchronous reproduction operating mode is activated in the computer 1 by pressing a key on the keyboard 8, the transcription means 16 read the recognized text information ETI from the second memory level 11 and execute the phonetic transcription of the entire recognized text information ETI. As a result of the phonetic transcription of the recognized text information ETI, the transcription means 16 issue phoneme information PI(ETI) for the recognized text information ETI, which contains phoneme sequences for the words of the recognized text and is stored in the fifth memory level 15.

The input means 13 are further designed for receiving correction information KWI of a correction word entered manually with the keyboard 8 so as to replace an incorrectly recognized word of the recognized text with the correction word. The transcription means 16 are further designed for phonetic transcription of the correction information KWI and for issuing phoneme information PI(KWI) for the correction information KWI, for which purpose the correction information KWI can be fed to the transcription means 16.

The transcription means 16 are designed for issuing the phoneme information PI(KWI) for the correction information KWI to the search means 17. The search means 17 are designed for finding the phoneme sequence of the at least one correction word in the phoneme sequences of the words of the recognized text and for issuing position information PI, which identifies the position of at least one word within the recognized text whose phoneme sequence essentially matches the phoneme sequence of the at least one correction word.

The search means 17 further form means for issuing the position information PI so as to enable a marking of the at least one word identified by the position information PI in the recognized text information ETI. For this purpose, the search means pass the position information PI for the word or words to be marked to the word-processing means 3, which in their turn pass corresponding screen information BI on to the monitor 7. The further functions and advantages of the correction device according to the invention will be described in more detail below on the basis of an application example presented in FIGS. 2 to 5 for the computer 1.

In the application example it is assumed that the user of computer 1 speaks the words "ONE TWO THREE FOUR FIVE SIX SEVEN EIGHT NINE TEN" into the microphone 5. In the speech recognition procedure of the speech recognition means 9, the recognized text information ETI of the recognized words "1 2 3 FOR 5 6 7 DAYS 9 THEN" is related to the corresponding spoken text information GTI.

The recognized text information ETI contains incorrectly recognized text information FETI for the incorrectly recognized words "FOR", "DAYS" and "THEN". As can be seen from Table 1, the phoneme sequences of the incorrectly recognized words and the spoken words that should actually be recognized are very similar, which is why the speech recognition means 9 made errors in recognition.

TABLE 1

| Word | Phoneme sequence |
|---|---|
| FOUR equals 4 | for |
| FOR | for,f@r |
| EIGHT equals 8 | Yt |
| DAYS | dYz |
| TEN equals 10 | ten |
| THEN | Den |

Figure 2:
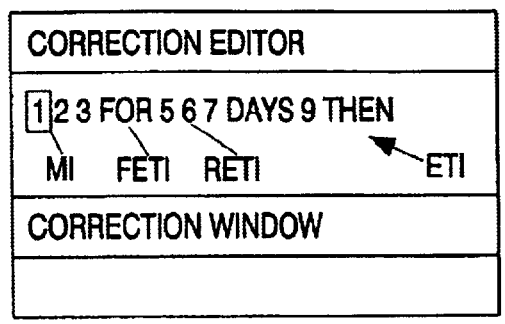
FIGS. 2 to 5 show screen information presented on a monitor by the correction device of the computer of FIG. 1.

In the application example it is now further assumed that the user activates the synchronous reproduction operating mode by pressing a key on the keyboard 8. The screen information BI shown in FIG. 2 is then presented on the monitor 7. When the synchronous reproduction operating mode is activated, the display on the monitor 7 is split into a CORRECTION EDITOR and a CORRECTION WINDOW. The CORRECTION EDITOR shows the corrected text information KTI of the corrected text which matches the recognized text information ETI of the recognized text immediately after activation of the synchronous reproduction operating mode. The CORRECTION WINDOW shows correction words put in by the user with the keyboard 8; these will be dealt with in detail below.

Immediately after activation of the synchronous reproduction operating mode, the word-processing means 3 begin with the acoustic reproduction of the first word "ONE" of the spoken text information GTI and mark the associated recognized word "1" of the recognized text information ETI with marker information MI. The user can thus very easily see that the recognized word actually matches the spoken word.

While the fourth word "FOUR" of the spoken text information GTI is being acoustically reproduced and optically marked, the user notices that this word was incorrectly recognized and puts in the word "4"—which should actually have been recognized—as a correction word or as correction information KWI on his keyboard 8.

Figure 3:
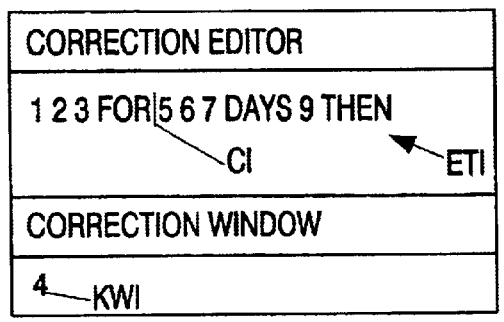

The correction device 4 is now advantageously designed for automatically interrupting the synchronous reproduction operating mode the moment the user begins to put in a correction word with the keyboard 8. As a result of this, the acoustic reproduction of the spoken text information GTI is interrupted, and cursor information CI is shown at the current position of the marker information MI, as can be seen in FIG. 3. Consequently, the user advantageously need not press any further key to interrupt the synchronous reproduction operating mode.

Immediately after activation of the synchronous reproduction operating mode, the transcription means 16 have transcribed the recognized text information ETI and stored the phoneme information PI(ETI) for the recognized text information ETI thus determined in the fifth memory level 15; As soon as the user has put in the correction word, the transcription means 16 transcribe the input correction information KWI and pass the determined phoneme information PI(KWI) for the correction information KWI on to the search means 17.

Figure 4:
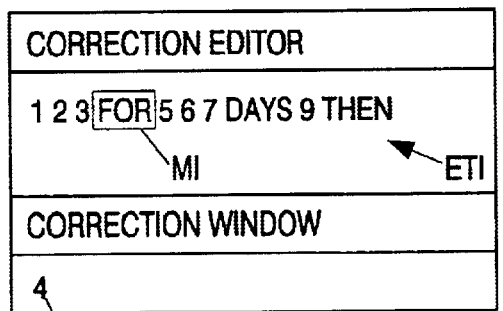
Figure 5:
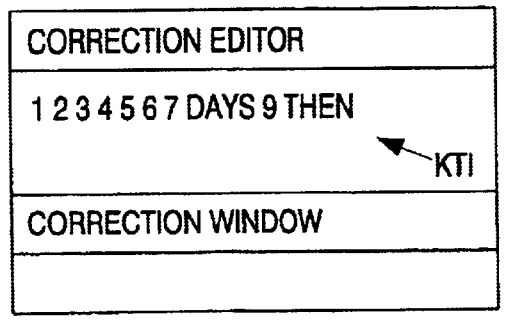

The search means 17 now begin to search in an adjustable search area of M=5 words before and N=3 words behind the current position of the cursor information CI, for the phoneme information PI(KWI) for the correction information KWI of the correction word in the phoneme information PI(ETI) of the recognized text information ETI. Since the phoneme information PI(KWI)="for" matches the phoneme information PI(ETI) "for" of the incorrectly recognized text information FETI within the search area of the recognized text information ETI, the search means 17 determine the position of the fourth word of the recognized text information ETI as position information PI. The search means 17 then pass the determined position information PI on to the word-processing device 3, whereupon the incorrectly recognized word "FOR"—as shown in FIG. 4—is marked with the marker information MI.

This has the advantage that the user—after noticing an incorrectly recognized word and interrupting the synchronous reproduction operating mode—need not mark the incorrectly recognized word that is to be replaced. Advantageously, to replace the incorrectly recognized word "FOR" with the input correction word "4", the user need only enter a confirmation, which can be done, for example, by pressing the "ENTER" key of the keyboard 8. Consequently, the replacement of incorrectly recognized words with the word that should actually have been recognized can be executed in a particularly simple and fast manner.

Advantageously, the interruption of the synchronous reproduction operating mode is also terminated by the input of the confirmation, so that the synchronous acoustic reproduction and the optical marking of associated recognized words of the recognized text information ETI is resumed.

The search for the phoneme information PI(KWI) of the correction information KWI within a search area of the phoneme information PI(ETI) of the recognized text information ETI creates the advantage that the incorrectly recognized word to be replaced is also found with particular reliability if the same word occurs again in a different location in the recognized text. If the search is not successful in the search area, then the search means 17 are advantageously designed for a step-wise expansion of the search area.

If the word marked in FIG. 4 is not the word the user wants to replace with the input correction word, he can input a next information NI, so that the search means 17 search again, in an expanded search area if applicable. As soon as the search means 17 have detected a satisfactory match of the phoneme information PI(ETI) and PI(KWI) of another not previously marked word, the search means 17 pass the position of this detected word as position information PI on to the word-processing device 3.

This has the advantage that, if the word automatically marked by the correction device 4 is not the word that the user wants to replace with the input correction word, the user by pressing just one key on the keyboard 8 can cause the automatic marking of a different word within the search area whose phoneme information PI(ETI) shows a close match to the phoneme information PI(KWI) of the correction word.

In the search for essentially matching phoneme sequences, the search means 17 are now developed to ignore phonemes that differ from the compared phoneme sequences but sound similar. Here, for example, the phonemes "o" and "@" are classed as so similar in sound that compared phoneme sequences that differ only in these two phonemes are assessed as matching.

This provides the advantage that the search means 17 reach a result even with small differences in the phoneme sequences being compared, in order to mark a word of the recognized text information ETI.

It may be mentioned that the search means 17 could alternatively use the phoneme information determined by the speech recognition means in the processing of the speech recognition procedure as the phoneme information PI(ETI) for the recognized text information ETI. This would yield the advantage that the transcription means do not have to transcribe the recognized text information ETI, and the fifth memory level need not be provided.

It is also especially advantageous to provide the correction device as part of the speech recognition device and to have the synchronous reproduction operating mode performed by the correction device. Commonly marketed word-processing software such as "Word for Windows®" could consequently be used.

It is to be noted that several words may also be put in as the correction information KWI, in order to replace one or several incorrectly recognized words at once.

It is to be noted that the search area may be set by the computer user. Thus the user may select practically any values, for example within the ranges N=1 to N=500 and M=1 to M=500.

It is to be noted that the phonetic transcription could alternatively be advantageously executed only for the words of the recognized text information ETI to be found in the search area.

It is to be noted that a correction device according to the invention may be used to special advantage with professional transcription services, since transcribers in such transcription services manually correct only words incorrectly recognized by the speech recognition device, and thus the condition is practically always met that the phoneme sequences of the incorrectly recognized words and the actually spoken words to be recognized are very similar.

What is claimed is:

1. A correction device (4) for correcting a text (ETI) recognized by a speech recognition device (2) for a spoken text (GTI), where the recognized text (ETI) for spoken words of the spoken text (GTI) includes correctly recognized words and incorrectly recognized words (FETI), the correction device comprising:

input means (13) for receiving at least one manually input correction word (KWI), in order to replace at least one of the incorrectly recognized words (FETI) with the at least one correction word (KWI);

transcription means (16) for phonetically transcribing at least the input correction word (KWT) into a phoneme sequence (PT(KWI));

search means (17) for finding the phoneme sequence (PT(KWI)) of the at least one correction word (KWT) in phoneme sequences (PT(KTI)) of the words of the recognized text based on an adjustable search area, wherein a step-wise expansion of the search area is performed when the search means does not find the phoneme sequence (PI(KWI)) of the at least one correction word (KWT) in phoneme sequences (PT(KTI)) of the words of the recognized text, and for issuing position information (PI) which identifies the position of at least one word within the recognized text (ETI) whose phoneme sequence essentially matches the phoneme sequence (PT(KWI)) of the at least one correction word (KWI); and output means (17) for issuing said position information (PI) so as to enable a marking of the at least one word identified by the position information (PI) in the recognized text information (ETI).

2. A correction device (4) as claimed in claim 1, wherein the correction device (4) is designed for interrupting a synchronous reproduction, in which the spoken words (GTI)

of the spoken text are acoustically reproduced and the recognized words of the recognized text (ETI) for the spoken words (GTI) are synchronously optically marked, when a correction ward (KWI) is manually input.

3. A correction device (4) as claimed in claim 2, wherein the correction device (4) is designed for terminating the interruption of the synchronous reproduction when the replacement of the at least one word identified by the position information (PI) with the at least one correction word (KWI) has been confirmed by manual input of a confirmation.

4. A correction device (4) as claimed in claim 2, wherein the search means (17) are designed so as to search for the phoneme sequence (PI(KWI)) of the at least one correction word (KWI) in the phoneme sequences (PI(ETI)) of the words contained in a search area of the recognized text, said search area being defined by a number of M words before and N words behind the last marked word in the recognized text (ETI) before the interruption of the synchronous reproduction.

5. A correction device (4) as claimed in claim 1, wherein the search means (17) are designed so as to search for the phoneme sequence (PI(KWI)) of the at least one correction word (KWI) in phoneme sequences determined by the speech recognition device (2) from the spoken words of the spoken text (GTI).

6. A correction device (4) as claimed in claim 5, wherein die correction device (4) is designed so as to form part of the speech recognition device (2).

7. A correction device (4) as claimed in claim 1, wherein the search means (17) are designed for ignoring phonemes that differ from the compared phoneme sequences but sound similar in the search for essentially matching phoneme sequences.

8. A correction method for correcting a text (GTI) recognized by a speech recognition device (2) for a spoken text, the recognized text (ETI) for spoken words of the spoken text (GTI) including correctly recognized words and incorrectly recognized words (FETI), the method comprising the following steps:

receiving at least one manually entered correction word (KWI), so as to replace at least one of the incorrectly recognized words (FETI) with the at least one correction word (KWI);

phonetically transcribing at least the input correction word (KWI) into a phoneme sequence (PT(KWI));

searching for the phoneme sequence of the at least one correction word (KWI) in phoneme sequences (PI(ETI)) of the words of the recognized text (ETI) based on an adjustable search area, wherein a step-wise expansion of the search area is performed when the searching step does not find the phoneme sequence (PI(KWI)) of the at least one correction word (KWT) in the phoneme sequences (PI(KTI)) of the words of the recognized text, mid issuing position information (PT) which identifies the position of at least one word within the recognized text (ETI) whose phoneme sequence essentially matches the phoneme sequence of the at least one correction word (KWI); and issuing the position information (PT) so as to enable marking of the at least one word identified by the position information (PI) in the recognized text information (ETI).

9. A correction method as claimed in claim 8, wherein the following further process step is performed:

interrupting a synchronous reproduction, in which the spoken words of the spoken text (GTI) are acoustically reproduced and the recognized words of the recognized text (ETI) are synchronously optically marked for the spoken words (GTI), when a correction word (KWI) is manually put in.

10. A correction method as claimed in claim 9, wherein the following further process step is performed:

terminating the interruption of the synchronous reproduction when the replacement of the at least one word identified by the position information (PT) with the at least one correction word (KWI) has been confirmed by manual input of a confirmation.

11. A correction method as claimed in claim 9, wherein the following further process step is performed:

searching for the phoneme sequence of the at least one correction word (KWI) in the phoneme sequences of the words contained iii a search area of the recognized text (ETI), the search area being defined by a number of M words before and N words behind the last marked word in the recognized text (ETI) before the interruption of the synchronous reproduction.

12. A correction method as claimed in claim 8, wherein the following further process step is performed:

searching for the phoneme sequence (PI(KWI)) of the at least one correction word (KWI) in phoneme sequences determined by the speech recognition device (2) from the spoken words of the spoken text (GTI).

13. A correction method as claimed in claim 8, wherein the following further process step is performed:

searching for essentially matching phoneme sequences, the phonemes that differ from the compared phoneme sequences but sound similar being ignored.

* * * * *